US011370272B2

(12) United States Patent
Abrego et al.

(10) Patent No.: US 11,370,272 B2
(45) Date of Patent: Jun. 28, 2022

(54) VEHICLE CLIMATE CONTROL SYSTEM WITH FILTERED CONDENSATE MISTING

(71) Applicant: NIO USA, Inc., San Jose, CA (US)

(72) Inventors: Armando Mendez Abrego, Sunnyvale, CA (US); Dewashish Kanta Prashad, San Jose, CA (US); Omnaath Guptha Harihara Gupta, Milpitas, CA (US); Joshua Smith, Los Gatos, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 219 days.

(21) Appl. No.: 16/734,140

(22) Filed: Jan. 3, 2020

(65) Prior Publication Data

US 2021/0206236 A1 Jul. 8, 2021

(51) Int. Cl.
*B60H 1/32* (2006.01)
*B60H 3/00* (2006.01)
*B60H 3/02* (2006.01)
*B05B 17/06* (2006.01)

(52) U.S. Cl.
CPC ....... *B60H 1/32331* (2019.05); *B60H 3/0035* (2013.01); *B60H 3/022* (2013.01); *B05B 17/06* (2013.01); *B60H 2003/026* (2013.01)

(58) Field of Classification Search
CPC .. B60H 1/32331; B60H 3/0035; B60H 3/022; B60H 2003/026; B05B 17/06; B05B 17/0646; B05B 7/0075; B05B 12/14
See application file for complete search history.

(56) References Cited

U.S. PATENT DOCUMENTS

| 4,852,638 A | | 8/1989 | Hildebrand et al. | |
| 5,011,632 A | * | 4/1991 | Yano | A61L 9/14 |
| | | | | 261/DIG. 89 |
| 5,466,399 A | * | 11/1995 | Von Kempski | F24F 3/12 |
| | | | | 261/DIG. 65 |
| 6,375,849 B1 | * | 4/2002 | Crabtree | B64D 13/08 |
| | | | | 454/157 |

(Continued)

FOREIGN PATENT DOCUMENTS

| CN | 201021099 | 2/2008 |
| CN | 101949578 | 1/2011 |
| CN | 108656903 | 10/2018 |

*Primary Examiner* — Emmanuel E Duke
(74) *Attorney, Agent, or Firm* — Sheridan Ross P.C.

(57) ABSTRACT

A vehicle climate control system includes a heating, ventilation, and air conditioning (HVAC) system where condensate from the system is conveyed to a misting device disposed at an air-conditioned outlet in the cabin of the vehicle. The misting device can be arranged at the exit of the air-conditioned outlet such that conditioned air is conveyed by the HVAC ducting and mixes with the mist generated by the misting device at the air-conditioned outlet. The mist may be scented using an injection device that pumps a fragrant fluid into the misting device along with the condensate. Prior to conveying the condensate to the misting device, the condensate may be pumped through bacteria and sediment filter media providing a clean supply of condensate to the misting device. Positioning the misting device at the air-conditioned outlet helps prevent mold or debris from being trapped in the HVAC system or ducting.

20 Claims, 7 Drawing Sheets

(56) References Cited

U.S. PATENT DOCUMENTS

| | | | |
|---|---|---|---|
| 2008/0067263 A1* | 3/2008 | Modlin | A01M 1/245 239/70 |
| 2008/0190862 A1* | 8/2008 | Matsuura | C02F 1/006 210/748.04 |
| 2012/0107172 A1* | 5/2012 | Ono | B60H 3/0035 422/123 |
| 2015/0030498 A1* | 1/2015 | Ooten | A61L 9/122 422/111 |
| 2018/0094825 A1* | 4/2018 | Peczalski | F24F 13/22 |
| 2019/0301779 A1* | 10/2019 | Shan | F25D 17/067 |

* cited by examiner

VEHICLE CLIMATE CONTROL SYSTEM WITH FILTERED CONDENSATE MISTING

FIELD

The present disclosure is generally directed toward vehicle climate control systems, and more particularly, toward vehicle heating, ventilation, and air conditioning systems.

BACKGROUND

Heating, ventilation, and air conditioning ("HVAC") systems have long been included in automobiles, whether as standard or optional equipment. Such systems typically comprise an HVAC unit that receives air, conditions the air as necessary (whether by heating or cooling, although in some instances no conditioning is needed or effected), mixes the air as necessary (e.g., mixes cooled air with fresh air or warm air with fresh air to achieve a desired air temperature), and blows the air through one or more ducts to one or more vents in the passenger cabin of the vehicle. HVAC units thus selectively provide air, for example, to various vents distributed throughout a cabin of a vehicle. The operation of typical HVAC units is described in U.S. Pat. No. 4,852,638, which is hereby incorporated herein by reference in its entirety.

The HVAC system of a vehicle generally conditions air to a comfortable temperature for occupants in the cabin of a vehicle. In some cases, ambient air is blown over a heat exchanger containing a fluid at a temperature lower than the ambient air temperature. As a result of this process, moisture from the ambient air condenses on the heat exchanger (e.g., an evaporator), forming condensed water droplets that fall to into a collection pan in the HVAC unit. The condensate moisture may then be expelled from the HVAC unit, usually via a simple tube and gravity that allows the condensate to drip to the ground out of the vehicle. In hot, humid climates, the amount of water collected by the HVAC unit can exceed one gallon per day. Accordingly, the condensate must be removed to avoid the formation of mildew and odors inside the HVAC unit.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
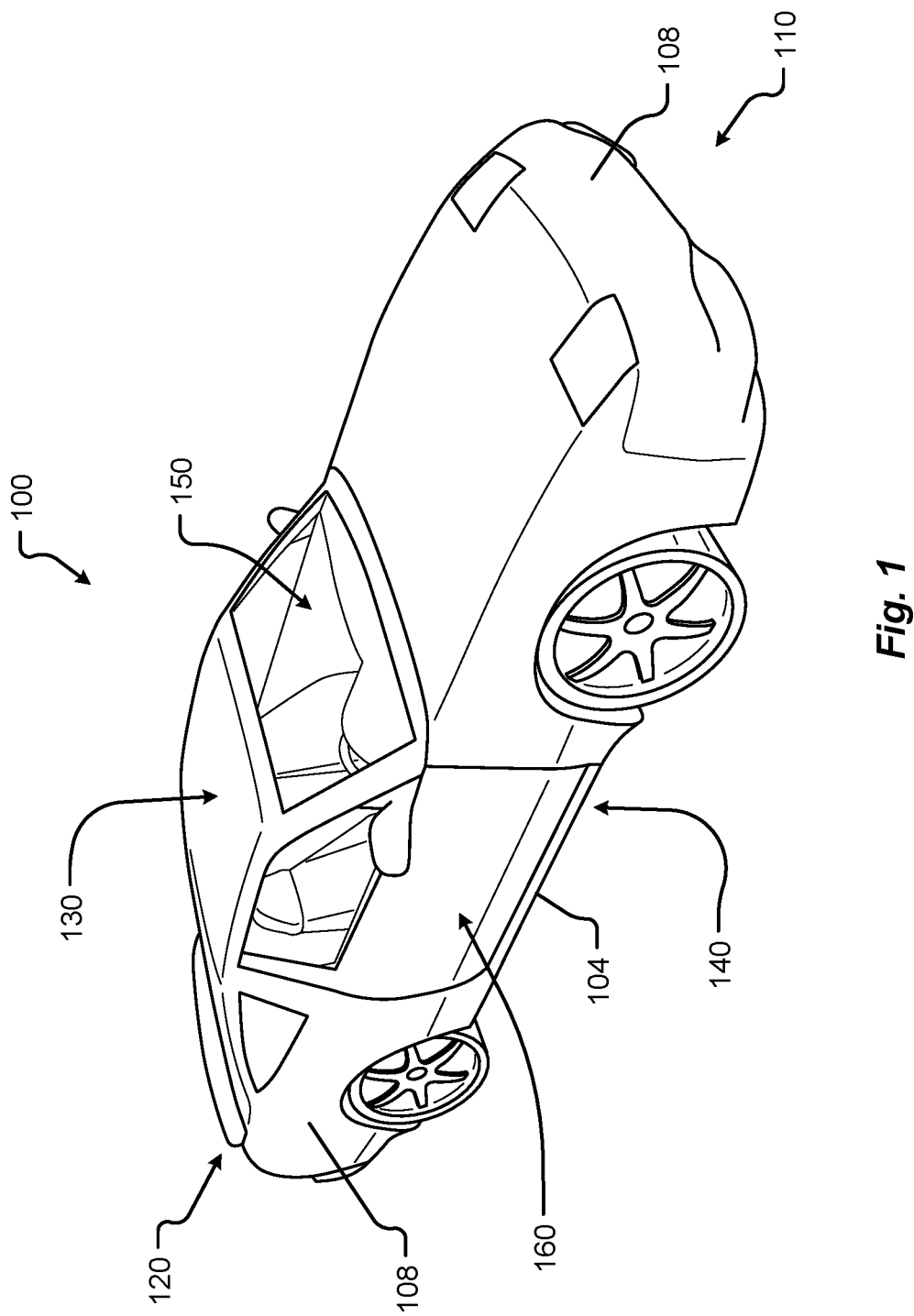
FIG. 1 shows a vehicle in accordance with embodiments of the present disclosure.

FIG. 1 shows a perspective view of a vehicle 100 (e.g., an electric vehicle, etc.) in accordance with embodiments of the present disclosure. The vehicle 100 comprises a vehicle front 110, vehicle aft 120, vehicle roof 130, at least one vehicle side 160, a vehicle undercarriage 140, and a vehicle interior or cabin 150. In any event, the vehicle 100 may include a frame 104 and one or more body panels 108 mounted or affixed thereto. The vehicle 100 may include one or more interior components (e.g., components inside an interior space or cabin 150, or user space, of a vehicle 100, etc.), exterior components (e.g., components outside of the interior space or cabin 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2A:
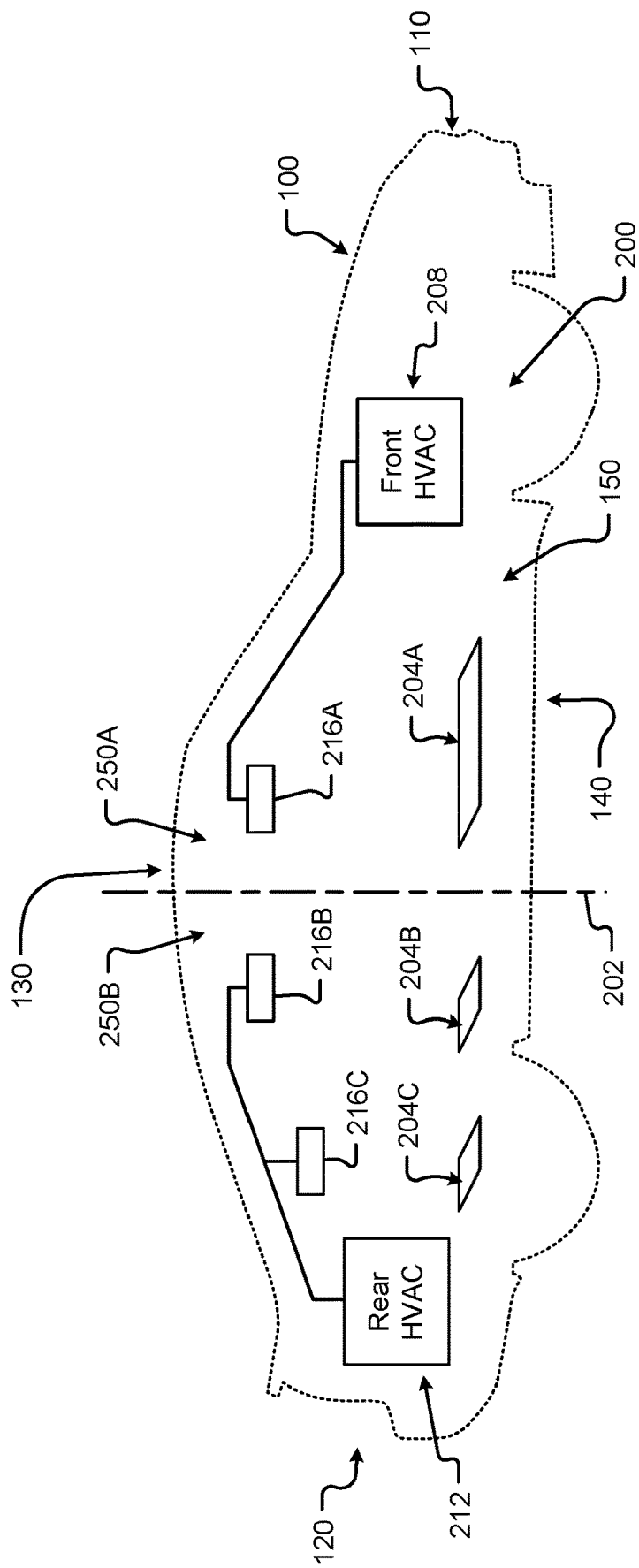
FIG. 2A shows a schematic block diagram of a climate control system in the vehicle in accordance with at least some embodiments of the present disclosure.
Figure 2B:
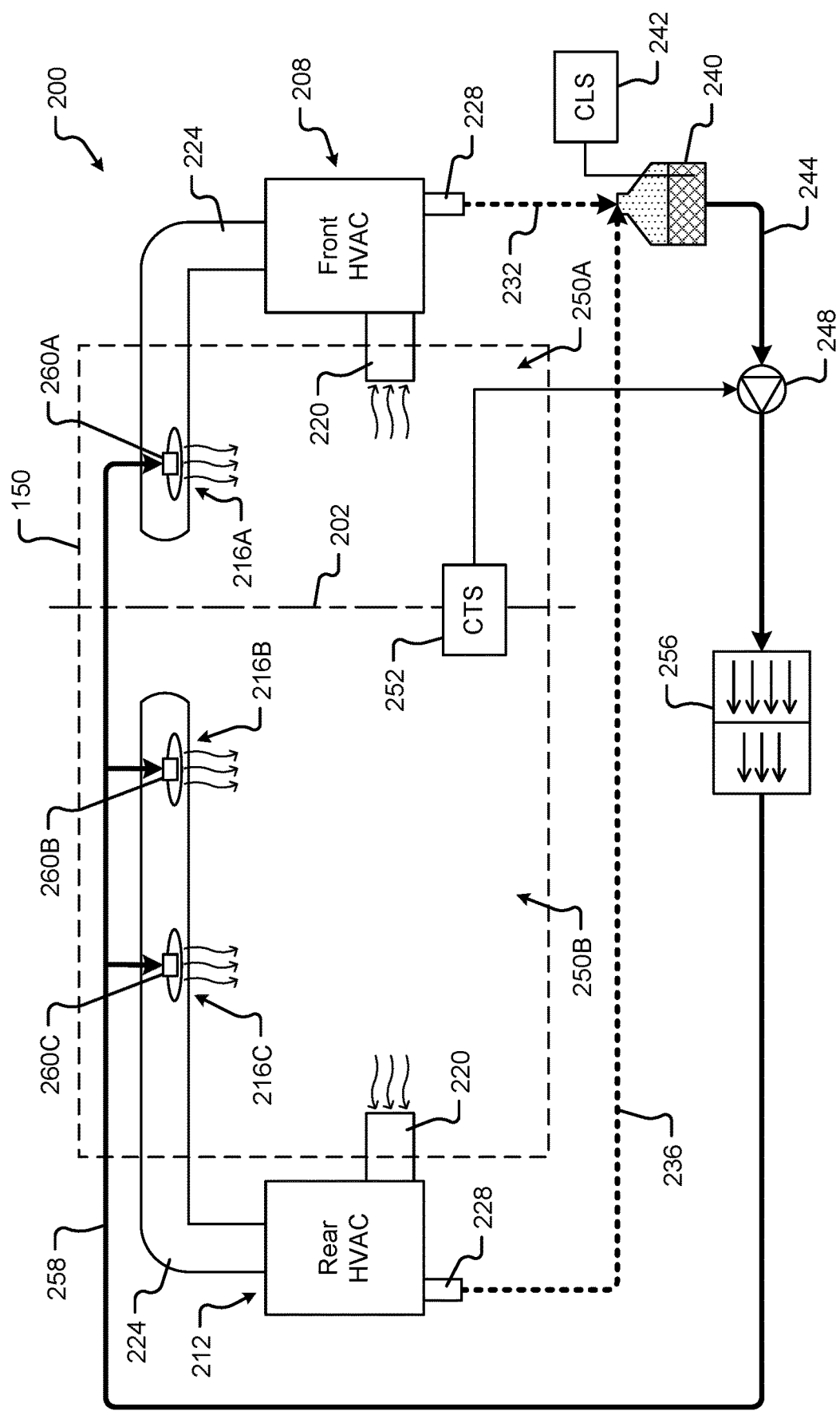
FIG. 2B shows a block diagram of the climate control system of FIG. 2A in accordance with embodiments of the present disclosure.

Referring now to FIGS. 2A-2B, block diagrams of the climate control system 200 are shown in accordance with embodiments of the present disclosure. FIG. 2A shows a block diagram of the climate control system 200 and various climate-controlled areas 250A, 250B and zones 204A-C of the vehicle 100. The climate zones 204A-C may correspond to seating positions, rows, or areas where an occupant of the vehicle 100 is located. For instance, the first climate zone 204A may correspond to a first row of seating positions in the vehicle 100 comprising a front driving seat and/or front passenger seat (e.g., disposed closest to the front 110 of the vehicle 100). The second climate zone 204B may correspond to a second row of seating positions (e.g., that is disposed directly behind the first row) and the third climate zone 204C may correspond to a third row of seating positions (e.g., that is disposed directly behind the second row and closest to a rear 120 of the vehicle 100, etc.). The cabin 150, or climate-controlled space, of the vehicle 100 may be separated into a front cabin area 250A and a rear cabin area 250B. This separation is shown visually in FIGS. 2A and 2B by a virtual cabin area dividing line 202. While the cabin 150 may not necessarily be physically separated by a wall or other element, the climate control system 200 may be described herein as controlling the climate associated with one or more climate zone 204A-C and/or cabin area 250A, 250B of the vehicle 100, in various combinations, with reference to the virtual cabin area dividing line 202.

The environment (e.g., temperature and/or humidity) of each climate zone 204A-C of the vehicle 100 may be climate-controlled, at least partially, by a respective misting system 216A-C. For example, the humidity in the first climate zone 204A may be controlled by the first misting system 216A, the humidity in the second climate zone 204B may be controlled by the second misting system 216B, and/or the humidity in the third climate zone 204C may be controlled by the third misting system 216C. In some embodiments, however, one or more of the misting systems 216A-C may control the humidity in a particular cabin area 250A, 250B or in the complete cabin 150 (e.g., including each cabin area 250A, 250B).

In some embodiments, the climate control system 200 may comprise at least one heating, ventilation, and air conditioning (HVAC) system 208, 212. For instance, the vehicle 100 may include a front HVAC system 208 and/or a rear HVAC system 212. Each HVAC system 208, 212 may comprise at least one air inlet 220, heat exchanger (e.g., an evaporator, etc.), condensate outlet 228 (e.g., evaporator drain, etc.), condensate line 232, 236, condensate reservoir 240 (e.g., that holds condensed water collected from the heat exchanger via the drain, etc.), cabin air filter, blower motor, heater core, HVAC outlet (e.g., that outputs conditioned air, etc.), vent or duct flap (e.g., flow-directional elements, doors, etc.), air duct 224 (e.g., that conveys the conditioned air from the HVAC outlet to the climate-controlled space), etc. The front HVAC system 208 may provide conditioned air to the front cabin area 250A of the climate-controlled space (e.g., the cabin 150) of the vehicle 100. The rear HVAC system 212 may provide conditioned air to the rear cabin area 250B of the climate-controlled space of the vehicle 100. In some embodiments, a single HVAC system 208, 212 may service both the front cabin area 250A and the rear cabin area 250B of the climate-controlled space. It is an aspect of the present disclosure that the front HVAC system 208 and/or the rear HVAC system 212 may cooperate with at least one misting system 216A-C to control a climate associated with any part of the cabin 150.

FIG. 2B shows a block diagram of the climate control system 200 schematically illustrated in FIG. 2A. As shown in FIG. 2B, condensed water (e.g., condensate) from the front HVAC system 208 and/or the rear HVAC system 212 may be conveyed via respective condensate lines 232, 236 to a condensate reservoir 240. The condensate reservoir 240 may correspond to a tank or other fluid container. A condensate level sensor 242 may measure and report a level of the condensate inside the condensate reservoir 240. The condensate level sensor 242 may comprise a mechanical float sensor, an optical sensor, an ultrasonic sensor, contact sensor, and/or the like, that is capable of determining an amount of condensate in the condensate reservoir 240. In some embodiments, the condensate level sensor 242 may measure when an amount of condensate in the condensate reservoir 240 has reached a threshold value for misting, a maximum value for storage, and/or other values.

Condensate may be conveyed in the climate control system 200 via a reservoir output line 244 running from the condensate reservoir 240 to a pump 248. The pump may comprise one or more components that mechanical move the condensate through the various pipes, tubes, or other fluid lines (e.g., the reservoir output line 244, filtered condensate line 258, etc.) in the climate control system 200. The pump 248 may include, but is in no way limited to, a centrifugal pump, gear pump, peristaltic pump, positive displacement pump, reciprocating pump, rotary pump, screw pump, velocity pump, etc., and/or combinations thereof. In some embodiments, the pump 248 may be activated based on a temperature and/or humidity measurement inside the cabin 150 of the vehicle 100. In one embodiment, this measurement may be made by the cabin temperature sensor 252. The cabin temperature sensor 252 may be configured to measure a temperature and/or a humidity level inside the cabin 150. For instance, the cabin temperature sensor 252 may comprise one or more thermocouples, thermistors, thermometers, hygrometers, and/or other environmental sensors.

Once activated, the pump 248 may pressurize, or force, the condensate through the filter 256. The filter 256 may comprise bacteria and/or particulate filtration media. Examples of filtration media may include, but are in no way limited to, activated carbon filters, cartridge filters, ionizers, ultraviolet (UV) radiation filters, reverse osmosis filters, mechanical filters, etc., and/or combinations thereof. The filtration media may include a physical element through which the condensate may pass while trapping sediment or particulate therein. In some embodiments, the filtration media may kill or remove bacteria in the condensate using one or more of UV light, chemical addition, heat, or the like.

The filtered condensate may be conveyed in the climate control system 200 via the filtered condensate line 258 by pressure created from the pump 248. This filtered condensate may be distributed to one or more misting systems 216A-C arranged adjacent to an outlet of the HVAC conditioned air duct. In particular, the filtered condensate is conveyed along the filtered condensate line 258 to one or more misting devices 260A-C that convert the filtered condensate into a mist. One example of a misting device 260A-C may include an ultrasonic vibratory device in which a vibratory element (e.g., a diaphragm, etc.) is electrically actuated to mechanically vibrate at an ultrasonic frequency (e.g., a frequency greater than 20,000 Hz, etc.). This vibration converts the filtered condensate into microscopic water droplets (e.g., a mist or fog, etc.) which are then expelled from the misting device 260A-C into the cabin 150 of the vehicle 100. As can be appreciated, this generation of mist by the misting devices 260A-C alters the humidity in the cabin 150. In some embodiments, the misting devices 260A-C can even increase the efficiency of occupant cooling (e.g., via the front HVAC system 208 and/or the rear HVAC system 212) by allowing the conditioned air directed by the air ducts 224 to mix with the mist produced by the misting devices 260A-C. This mixed cooling medium provides an enhanced heat transfer mode (e.g., including both conduction and convection) that an HVAC system 208, 212 cannot provide through convection cooling alone.

In some embodiments, the misting devices 260A-C may correspond to cool humidifiers that use energy to excite a diaphragm piezoelectric transducer to create a high frequency mechanical oscillation, which, in contact with a film of water, creates an extremely fine mist of droplets to form a cool fog able to be used in combination with the air flow provided from the HVAC system 208, 212 to improve heat transfer between flow and surrounding occupants, resulting in comfort improvements by means of reduced ambient temperature, relaxing visual sensation, and/or accompanied by fragrance dispensing.

Figure 3A:
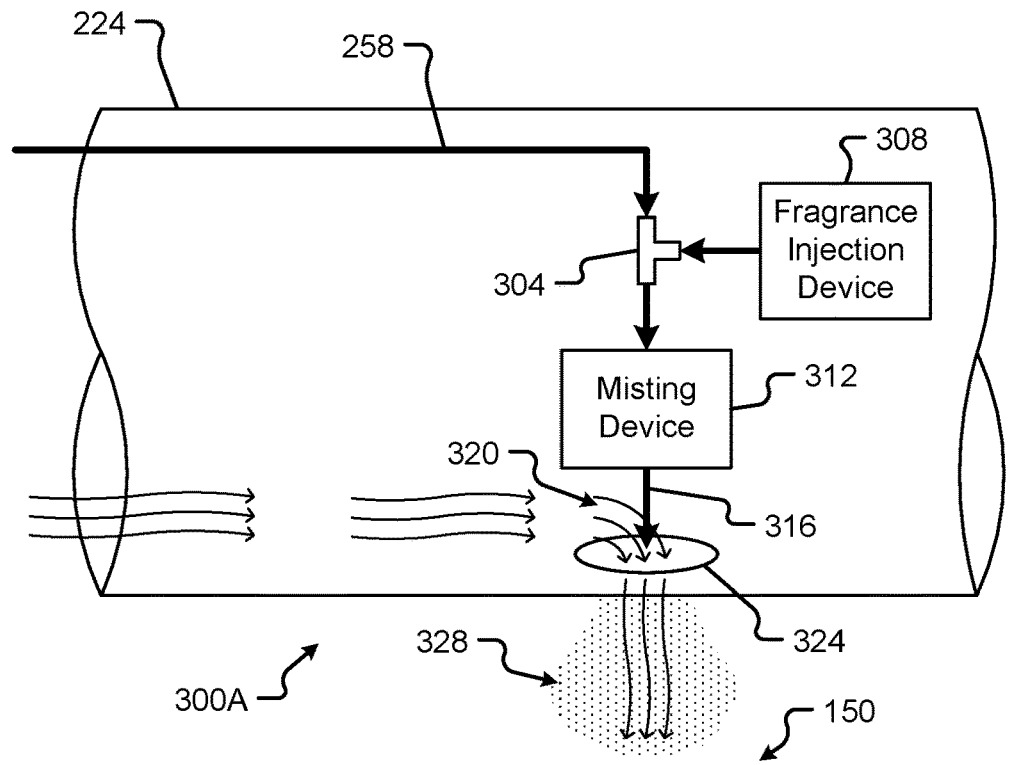
FIG. 3A shows a block diagram of a misting system of the climate control system in accordance with embodiments of the present disclosure.
Figure 3B:
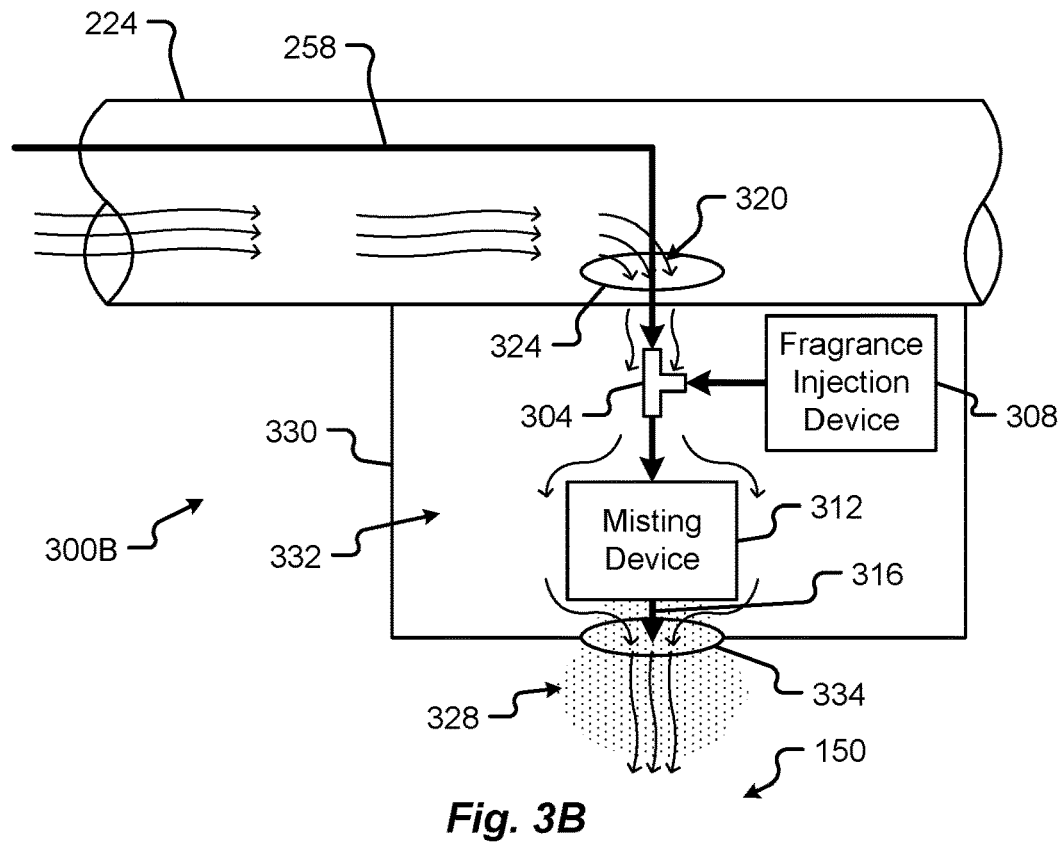
FIG. 3B shows a block diagram of a misting system of the climate control system in accordance with embodiments of the present disclosure.

FIGS. 3A-3B show block diagrams of embodiments of the misting systems 216A-216C illustrated in the schematic diagrams of the climate control system 200 shown in FIGS. 2A-2B. The misting system 300A shown in FIG. 3A comprises a fluid control valve 304 interconnected with the filtered condensate line 258, the fragrance injection device 308, and the misting device 312. As provided above, the misting device 312 may correspond to at least one of the misting devices 260A-C described in conjunction with FIG. 2B. For instance, the misting device 312 may be an ultrasonic vibratory device having at least one vibratory element (e.g., diaphragm, plate, etc.). In some embodiments, the filtered condensed water may be conveyed via the filtered condensate line 258 to a first port of the fluid control valve

304. The fluid control valve 304 may control a flow of the condensed water (e.g., from the filtered condensate line 258) to an input (e.g., inlet port, etc.) of the misting device 312. Additionally or alternatively, the fluid control valve 304 may control a flow of a fragrant fluid received from the fragrance injection device 308 into the input of the misting device 312. The fluid control valve 304 may be a three-way valve that is controlled, or actuated, via a processor to open and close flow paths between one or more of the ports. For example, the fluid control valve 304 may close or shut-off the flow of filtered condensate supplied to the misting device 312 and/or the flow of the fragrant fluid supplied by the fragrance injection device 308, individually or together. As another example, the fluid control valve 304 may open or direct the flow of filtered condensate supplied to the misting device 312 and/or the flow of the fragrant fluid supplied by the fragrance injection device 308, individually or together.

In one embodiment, the condensed water may be directed via the fluid control valve 304 to the misting device 312. More specifically, the condensed water may be introduced at a particular flow or volume to a vibratory element in the misting device 312. The vibratory element, when actuated, converts the condensed water into a condensate mist output 316 (e.g., a mist or fog) that is expelled adjacent to the outlet 324. As shown in FIG. 3A, the misting device 312 may be disposed inside the air duct 224 immediately adjacent the outlet 324. A gap may be disposed between the output of the misting device 312 and the outlet 324 to allow conditioned air 320 to pass therethrough. When the conditioned air 320 mixes with the condensate mist output 316, a mixed thermal output 328 (e.g., comprising the mist 316 and the conditioned air 320) is expelled into the cabin 150 (e.g., the climate-controlled space of the vehicle 100). Positioning the misting device 312 close to the outlet 324 prevents mist from being trapped in the air duct 224, which prevents the build-up, or collection, of mold or other fungus and bacteria in the climate control system 200.

Prior to expelling the mist from the misting device 312, the fragrance injection device 308 may inject a fragrant fluid, via the fluid control valve 304, into the input of the misting device 312. The fragrant fluid may be injected along with the flow of condensed water flowing to the misting device 312. This fragrant fluid and condensed water mix, once converted into a mist by the misting device 312, may be expelled by the misting device 312 into the cabin 150 of the vehicle 100. The fragrance injection device 308 may correspond to machine including a pump and a reservoir of scented fluid. When activated (e.g., via a controller or processor), the pump may convey the scented or fragrant fluid from the reservoir (e.g., a tank, cartridge, chamber, or other container, etc.) into the fluid control valve 304 and along a fluid line to the input of the misting device 312. The fragrant fluid may be conveyed in metered amounts, continually, and/or periodically. In some embodiments, the pump of the fragrance injection device 308 may correspond to a volumetric pump, a centrifugal pump, a diaphragm pump, a peristaltic pump, a piston pump, and/or the like.

Similar to the misting system 300A of FIG. 3A, the misting system 300B shown in FIG. 3B comprises a fluid control valve 304 interconnected with the filtered condensate line 258, the fragrance injection device 308, and the misting device 312. The components of the misting system 300B of FIG. 3B may be similar, if not identical, to the components described in conjunction with FIG. 3A. As such, the description of the components or elements having the same reference character in FIG. 3A equally apply to those components or elements shown in FIG. 3B and will be omitted in the description of the misting system 300B associated with FIG. 3B.

In the misting system 300B of FIG. 3B, the misting device 312 may be disposed adjacent to the outlet 324 on an outside of the air duct 224. For instance, the misting device 312, the fragrance injection device 308, and/or the fluid control valve 304 may be arranged in the chamber 332 of a housing 330 that is attached to the air duct 224. In the misting system 300B of FIG. 3B, as the conditioned air 320 passes through the outlet 324 of the air duct 224, the conditioned air 320 enters the chamber 332 of the housing 330. The housing 330 may comprise a sealed environment having an opening at the outlet 324 of the air duct 224 and an opening at a housing aperture 334 that is disposed in the cabin 150 of the vehicle 100. The conditioned air 320 may exit the housing 330 via the housing aperture 334.

The misting device 312 in FIG. 3B may be arranged such that the condensed water (e.g., filtered condensate from the filtered condensate line 258) is introduced at a particular flow or volume to the vibratory element in the misting device 312, which can then be converted (e.g., via actuation of the vibratory element) into a condensate mist output 316 that is expelled through the housing aperture 334. As shown in FIG. 3B, the misting device 312 may be disposed outside of the air duct 224 between the outlet 324 and the housing aperture 334. The conditioned air 320 may pass through the outlet 324 into the chamber 332 of the housing 330. When the conditioned air 320 mixes with the condensate mist output 316, a mixed thermal output 328 (e.g., comprising the mist 316 and the conditioned air 320) is expelled into the cabin 150 (e.g., the climate-controlled space of the vehicle 100) through the housing aperture 334. Positioning the misting device 312 outside of the outlet 324 allows the conditioned air 320 to move the mist generated by the misting device 312 out of the housing 330 via the housing aperture 334. Among other things, this arrangement prevents retention of mist in the housing 330 and/or the air duct 224 and eliminates the possibility of mold or other fungus and bacteria from building-up in the climate control system 200.

In some embodiments, the fragrance injection device 308 may be disposed in the chamber 332 of the housing 330. Prior to expelling the mist from the misting device 312, the fragrance injection device 308 may inject a fragrant fluid, via the fluid control valve 304, into the input of the misting device 312. The fragrant fluid may be injected along with the flow of condensed water flowing to the misting device 312. This fragrant fluid and condensed water mix, once converted into a mist by the misting device 312, may be expelled by the misting device 312 into the cabin 150 of the vehicle 100 via the housing aperture 334. Similar to the operation described in conjunction with FIG. 3A, the fragrant fluid may be conveyed in metered amounts, continually, and/or periodically via the fragrance injection device 308.

In the embodiments show in FIGS. 3A-3B, at least a portion of the filtered condensate line 258 may be disposed in the air duct 224. Alternatively, the filtered condensate line 258 may be routed separately from the air duct 224. In any event, the filtered condensate line 258 is a separate line from the air duct 224. Among other things, this arrangement allows the filtered condensate to remain in the filtered condensate line 258 without mixing with the conditioned air 320 or the inside of the air duct 224 and provides separate control of the conditioned air 320 and the filtered condensate in the filtered condensate line 258. The generation of cold mist or fog, via the misting device 312 and/or the fragrance injection device 308 improves cabin 150 comfort (e.g., ambient temperature, humidity, and scent/fragrance, etc.) for occupants of the vehicle 100.

In addition to reusing condensate from the HVAC system 208, 212, the temperature and fragrance in the flow of conditioned air 320 when combined with a cool mist provides additional efficiencies. For instance, the combined output provides multiple modes of heat transfer including conduction and convection cooling. Conduction, where the cooled mist (e.g., fine droplets of condensed water) of the mixed thermal output 328 contacts the skin of an occupant, and convection, where the cooled conditioned air 320 in the mixed thermal output 328 passes by the occupant in the cabin. Additionally or alternatively, the multiple-mode conditioning of the climate control system 200 improves efficiency of the HVAC system 208, 212, especially for one or more outlets 324 in the air ducts 224 where the temperature targets are difficult to achieve (e.g., the second climate zone 204B and the third climate zone 204C associated with the second and third row, respectively, of the vehicle 100) with the injection of the cool fog or mist into the cabin 150. Expelling a fine fog, or mist, from the outlets 324 of the air ducts 224 also provides a pleasing visual experience for occupants of the vehicle 100. As can be appreciated, when the vehicle 100 is operating in a manual driving mode, the expulsion of mist from the first misting system 216A (e.g., associated with a driver's seating position, or the first row, of the vehicle 100) may be restricted or even prevented from functioning to provide a clear view for the driver of an environment outside of the vehicle 100.

For long periods of HVAC operations, especially air conditioning operations in hot weather scenarios involving recirculation of the cabin air, the humidity of the recirculated air in a conventional HVAC system may be drastically reduced promoting eye and nasal dryness, resulting in occupant discomfort. It is an aspect of the present disclosure that the climate control system 200 provides indirect humidification of the cabin 150 preventing cabin dryness (e.g., and resulting eye and nasal dryness of an occupant, etc.) and provide a balanced internal environment in the cabin 150 of the vehicle 100. The fragrances added to the mist may correspond to any scents that are able to dissolve in water. Examples of scents or fragrances may include any scent, or combination of scents, identified in conjunction with the fragrance wheel comprising, but in no way limited to, floral notes, oriental notes, woody notes, and fresh notes. The fragrant fluid may be made from extracts or oils (e.g., citrus, plant, etc.) and/or the like. Adding the fragrant fluid to the mist (e.g., via the fragrance injection device 308) may improve occupant sensation by the diffusion of an aroma associated with the fragrant fluid throughout the cabin 150.

Additional benefits of the climate control system 200 described herein include, but are in no way limited to, the elimination, or substantial reduction, of condensed fluid from the HVAC system 208, 212 through reuse in the climate control system 200; the usage of the condensed fluid to improve cabin 150 air humidity via generation of cool mist; the use of cool mist and condensed fluid to improve the efficiency of the cabin 150 air temperature via the introduction of cool mist into the air distribution system (e.g., the climate control system 200) of the vehicle 100; and the improvement of cabin 150 odor via the introduction of diluted aromatics (e.g., from the fragrance injection device 308) into the fluid used for the cold mist. The climate control system 200 described herein may not only be used in conjunction with a rear HVAC system 212 along, but for any HVAC system 208, 212 that benefits from one or more of temperature efficiency improvements, conditioning the cabin 150 ambient environment using humidifiers, and/or conditioning the cabin 150 ambient environment using fragrances or scents.

Figure 4A:
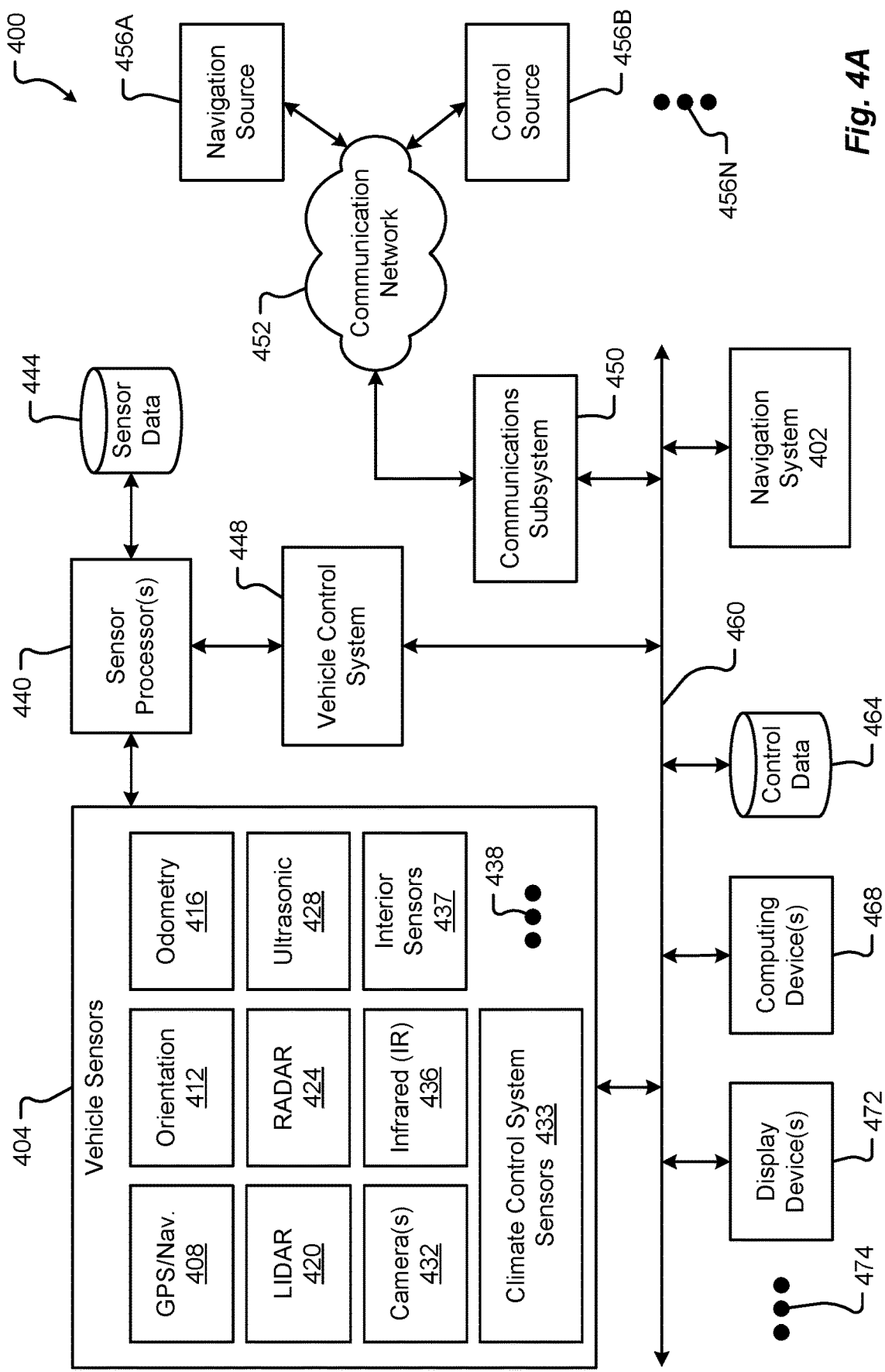
FIG. 4A is a block diagram illustrating a first portion of a communication environment of the vehicle in accordance with embodiments of the present disclosure.

FIG. 4A is a block diagram illustrating a first portion of a communication environment 400 of the vehicle 100 in accordance with embodiments of the present disclosure. The communication system 400 may include one or more vehicle sensors and systems 404, sensor processors 440, sensor data memory 444, vehicle control system 448, communications subsystem 450, control data 464, computing devices 468, display devices 472, and other components 474 that may be associated with a vehicle 100. These associated components may be electrically and/or communicatively coupled to one another via at least one bus 460. In some embodiments, the one or more associated components may send and/or receive signals across a communication network 452 to at least one of a navigation source 456A, a control source 456B, or some other entity 456N.

In accordance with at least some embodiments of the present disclosure, the communication network 452 may comprise any type of known communication medium or collection of communication media and may use any type of protocols, such as SIP, TCP/IP, SNA, IPX, AppleTalk, and the like, to transport messages between endpoints. The communication network 452 may include wired and/or wireless communication technologies. The Internet is an example of the communication network 452 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 452 need not be limited to any one network type, and instead may be comprised of a number of different networks and/or network types. The communication network 452 may comprise a number of different communication media such as coaxial cable, copper cable/wire, fiber-optic cable, antennas for transmitting/receiving wireless messages, and combinations thereof.

The vehicle sensors and systems 404 may include at least one navigation 408 (e.g., global positioning system (GPS), etc.), orientation 412, odometry 416, LIDAR 420, RADAR 424, ultrasonic 428, camera 432, climate control system sensor 433, infrared (IR) 436, interior 437, and/or other sensor or system 438.

The navigation sensor 408 may include one or more sensors having receivers and antennas that are configured to utilize a satellite-based navigation system including a network of navigation satellites capable of providing geolocation and time information to at least one component of the vehicle 100. Examples of the navigation sensor 408 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 412 may include one or more sensors configured to determine an orientation of the vehicle 100 relative to at least one reference point. In some embodiments, the orientation sensor 412 may include at least one pressure transducer, stress/strain gauge, accelerometer, gyroscope, and/or geomagnetic sensor. Examples of the navigation sensor 408 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 416 may include one or more components configured to determine a change in position of the vehicle 100 over time. In some embodiments, the odometry system 416 may utilize data from one or more other sensors and/or systems 404 in determining a position (e.g., distance, location, etc.) of the vehicle 100 relative to a previously measured position for the vehicle 100. Additionally or alternatively, the odometry sensors 416 may include one or more encoders, Hall speed sensors, and/or other measurement sensors/devices configured to measure a wheel speed, rotation, and/or number of revolutions made over time. Examples of the odometry sensor/system 416 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-Coder-Pro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 420 may include one or more components configured to measure distances to targets using laser illumination. In some embodiments, the LIDAR sensor/system 420 may provide 3D imaging data of an environment around the vehicle 100. The imaging data may be processed to generate a full 360-degree view of the environment around the vehicle 100. The LIDAR sensor/system 420 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 420 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 420 may detect when light from the plurality of laser beams emitted into the measurement environment returns (e.g., reflected echo) to the LIDAR sensor/system 420. The LIDAR sensor/system 420 may calculate, based on a time associated with the emission of light to the detected return of light, a distance from the vehicle 100 to the illuminated target. In some embodiments, the LIDAR sensor/system 420 may generate over 2.0 million points per second and have an effective operational range of at least 100 meters. Examples of the LIDAR sensor/system 420 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 424 may include one or more radio components that are configured to detect objects/targets in an environment of the vehicle 100. In some embodiments, the RADAR sensors 424 may determine a distance, position, and/or movement vector (e.g., angle, speed, etc.) associated with a target over time. The RADAR sensors 424 may include a transmitter configured to generate and emit electromagnetic waves (e.g., radio, microwaves, etc.) and a receiver configured to detect returned electromagnetic waves. In some embodiments, the RADAR sensors 424 may include at least one processor configured to interpret the returned electromagnetic waves and determine locational properties of targets. Examples of the RADAR sensors 424 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 428 may include one or more components that are configured to detect objects/targets in an environment of the vehicle 100. In some embodiments, the ultrasonic sensors 428 may determine a distance, position, and/or movement vector (e.g., angle, speed, etc.) associated with a target over time. The ultrasonic sensors 428 may include an ultrasonic transmitter and receiver, or transceiver, configured to generate and emit ultrasound waves and interpret returned echoes of those waves. In some embodiments, the ultrasonic sensors 428 may include at least one processor configured to interpret the returned ultrasonic waves and determine locational properties of targets. Examples of the ultrasonic sensors 428 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 432 may include one or more components configured to detect image information associated with an environment of the vehicle 100. In some embodiments, the camera sensors 432 may include a lens, filter, image sensor, and/or a digital image processer. It is an aspect of the present disclosure that multiple camera sensors 432 may be used together to generate stereo images providing depth measurements. Examples of the camera sensors 432 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 436 may include one or more components configured to detect image information associated with an environment of the vehicle 100. The IR sensors 436 may be configured to detect targets in low-light, dark, or poorly-lit environments. The IR sensors 436 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 436 may include at least one processor configured to interpret the returned IR light and determine locational properties of targets. The IR sensors 436 may be configured to detect and/or measure a temperature associated with a target (e.g., an object, pedestrian, other vehicle, etc.). Examples of IR sensors 436 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The interior sensors 437 may include passenger compartment temperature sensors (utilized, e.g., in connection with a vehicle climate control system), humidity sensors, passenger compartment occupancy sensors (utilized, e.g., in connection with vehicle safety systems, including passive and active restraint systems); wheel-speed sensors (utilized, e.g., in connection with an anti-lock braking system and/or an electronic traction control system); door sensors (utilized, e.g., to communicate to a vehicle operator whether the vehicle doors are locked or unlocked, and/or open or closed); light sensors (utilized, e.g., to automatically adjust the brightness of instrument panel lighting); electronic system temperature sensors (utilized, e.g., to determine whether vehicle electronic systems are within appropriate operating temperature ranges, and, in some embodiments, to enable a vehicle cooling system to route coolant to electronic systems within the vehicle that are most in need of cooling); coolant temperature sensors (utilized, e.g., to facilitate efficient vehicle thermal management); and pressure-temperature transducers (also utilized, e.g., to facilitate efficient vehicle thermal management).

A navigation system 402 can include any hardware and/or software used to navigate the vehicle either manually or autonomously.

In some embodiments, the driving vehicle sensors and systems 404 may include other sensors 438 and/or combinations of the sensors 408-437 described above. Additionally or alternatively, one or more of the sensors 408-437 described above may include one or more processors or controllers configured to process and/or interpret signals detected by the one or more sensors 408-437. In some embodiments, the processing of at least some sensor information provided by the vehicle sensors and systems 404 may be processed by at least one sensor processor 440. Raw and/or processed sensor data may be stored in a sensor data memory 444 storage medium. In some embodiments, the sensor data memory 444 may store instructions used by the sensor processor 440 for processing sensor information provided by the sensors and systems 404. In any event, the sensor data memory 444 may be a disk drive, optical storage device, solid-state storage device such as a random-access memory ("RAM") and/or a read-only memory ("ROM"), which can be programmable, flash-updateable, and/or the like.

The vehicle control system 448 may receive processed sensor information from the sensor processor 440 and determine to control an aspect of the vehicle 100. Controlling an aspect of the vehicle 100 may include presenting information via one or more display devices 472 associated with the vehicle, sending commands to one or more computing devices 468 associated with the vehicle, and/or controlling a driving operation of the vehicle. In some embodiments, the vehicle control system 448 may correspond to one or more computing systems that control driving operations of the vehicle 100 in accordance with the Levels of driving autonomy described above. In one embodiment, the vehicle control system 448 may operate a speed of the vehicle 100 by controlling an output signal to the accelerator and/or braking system of the vehicle. In this example, the vehicle control system 448 may receive sensor data describing an environment surrounding the vehicle 100 and, based on the sensor data received, determine to adjust the acceleration, power output, and/or braking of the vehicle 100. The vehicle control system 448 may additionally control steering and/or other driving functions of the vehicle 100.

The vehicle control system 448 may communicate, in real-time, with the driving sensors and systems 404 forming a feedback loop. In particular, upon receiving sensor information describing a condition of targets in the environment surrounding the vehicle 100, the vehicle control system 448 may autonomously make changes to a driving operation of the vehicle 100. The vehicle control system 448 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 404, vehicle control system 448, display devices 472, etc.) may communicate across the communication network 452 to one or more entities 456A-N via a communications subsystem 450 of the vehicle 100. For instance, the navigation sensors 408 may receive global positioning, location, and/or navigational information from a navigation source 456A. In some embodiments, the navigation source 456A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 448 may receive control information from one or more control sources 456B. The control source 456 may provide vehicle control information including autonomous driving control commands, vehicle operation override control commands, and the like. The control source 456 may correspond to an autonomous vehicle control system, a traffic control system, an administrative control entity, and/or some other controlling server. It is an aspect of the present disclosure that the vehicle control system 448 and/or other components of the vehicle 100 may exchange communications with the control source 456 across the communication network 452 and via the communications subsystem 450.

Information associated with controlling driving operations of the vehicle 100 may be stored in a control data memory 464 storage medium. The control data memory 464 may store instructions used by the vehicle control system 448 for controlling driving operations of the vehicle 100, historical control information, autonomous driving control rules, and the like. In some embodiments, the control data memory 464 may be a disk drive, optical storage device, solid-state storage device such as a random-access memory ("RAM") and/or a read-only memory ("ROM"), which can be programmable, flash-updateable, and/or the like.

Figure 4B:
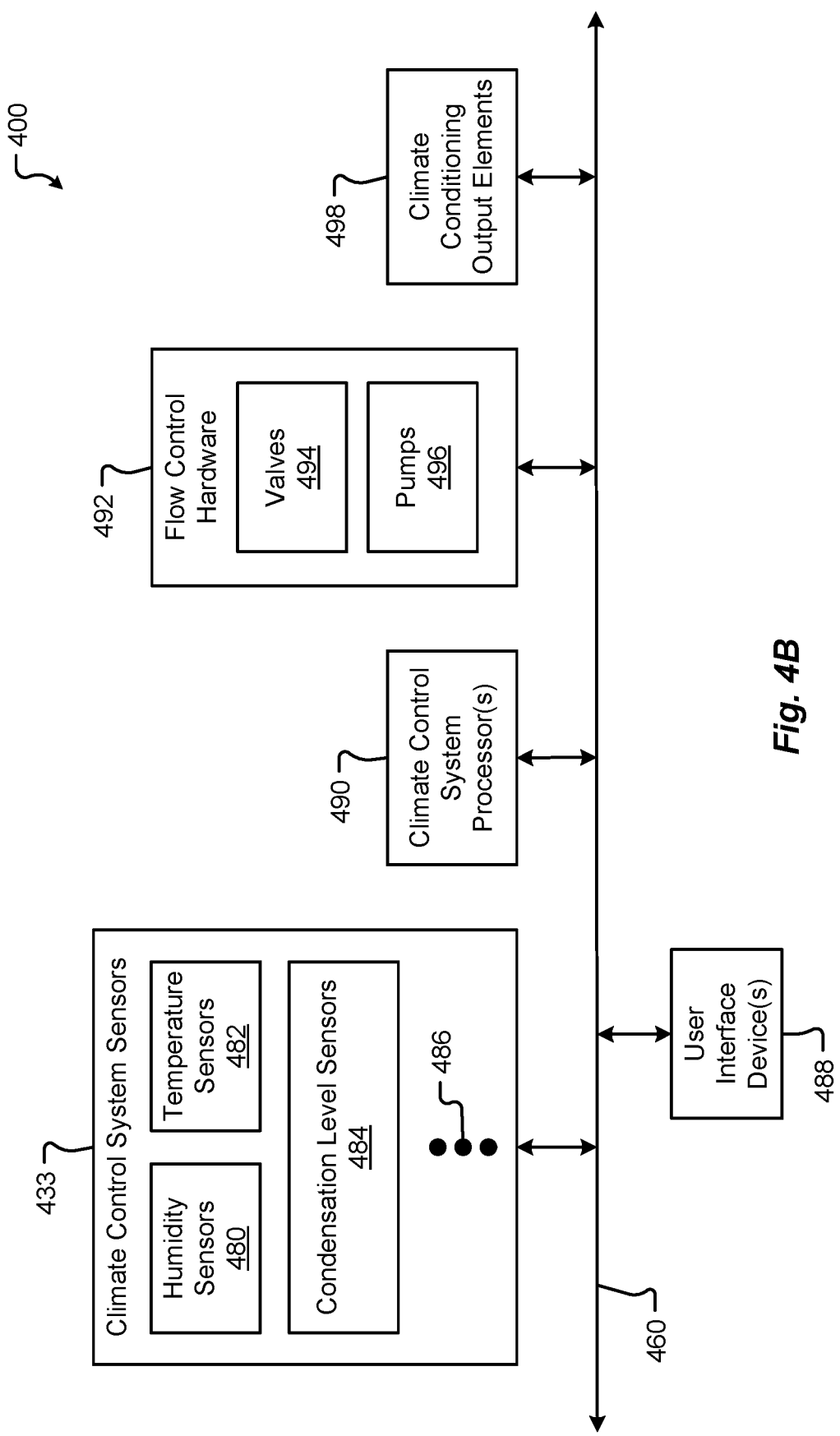
FIG. 4B is a block diagram illustrating a second portion of a communication environment of the vehicle in accordance with embodiments of the present disclosure.

Referring to FIG. 4B, a block diagram illustrating a second portion of a communication system 400 of the vehicle 100 is shown in accordance with embodiments of the present disclosure. The communication system 400 may comprise one or more components, devices, systems, and interfaces that are associated with the thermal management system of the vehicle 100. For instance, the communication system, as shown in FIG. 4B, may comprise the climate control system sensors 433, the user interface device(s) 488, one or more climate control system processors 490, flow control hardware 492, climate conditioning output elements 498, and/or the like. The various components shown in FIG. 4B may be in communication with one another and/or in communication with the components illustrated in FIG. 4A (e.g., via the bus 460, etc.). The bus 460 may be configured as a power and/or a communications bus.

The climate control system sensors 433 may comprise humidity sensors 480, temperature sensors 482, condensation level sensors 484, and/or other measurement/monitoring sensors 486.

The humidity sensors 480 may include, but are in no way limited to, hygrometers such as capacitive humidity sensors, resistive humidity sensors, and/or thermal sensors, etc. The humidity sensors may measure an amount of humidity between 0% and 100% and may provide a full-range relative humidity measurement inside the cabin 150 of the vehicle 100. In some embodiments, the cabin temperature sensor 252 may comprise one or more humidity sensors 480. It is an aspect of the present disclosure that the humidity measurement may be reported to the climate control system processor(s) 490 for interpretation and control of the various elements of the climate control system 200.

The temperature sensors 482 may include, but are in no way limited to, resistive temperature detectors, thermistors (e.g., positive temperature coefficient (PTC) thermistors, negative temperature coefficient (NTC) thermistors, etc.), thermocouples, thermometers, thermostats, etc., and/or combinations thereof. In some embodiments, the temperature sensors 482 may measure and even report a potential difference between two dissimilar metals that are exposed to a temperature sensing environment. In one embodiment, the temperature sensors 482 may monitor a change in the volume of a fluid that is subjected to a change in temperature (e.g., a mercury or alcohol thermometer, etc.) via a photosensor and a measurement scale or reference.

The condensation level sensors 484 may comprise one or more sensors that measure a level of condensate in the condensate reservoir 240. In some embodiments, the condensation level sensors 484 may correspond to the condensate level sensor 242 described in conjunction with FIG. 2B and vice versa. The condensation level in the condensate reservoir 240 may be measured as a particular level (e.g., amount of fluid in the condensate reservoir 240, etc.), a threshold level (e.g., above or below a predetermined threshold value, etc.), and/or combinations thereof. The condensation level sensors 484 may correspond to an ultrasonic level sensor, pressure level sensor, float level sensor, mechanical level sensor, electrical sensor, etc., and/or combinations thereof.

The other sensors 486 may comprise one or more sensors that measure an operation and/or functionality of one or more components in the climate control system 200 via optical sensing, mechanical sensing, electrical sensing, etc., and/or various combinations of sensing. For instance, the other sensors 486 may comprise one or more strain gauges, flow meters, electrical measurement sensors, that are operatively interconnected with one or more components in the climate control system 200. These components of the climate control system 200 may include but are in no way limited to, the climate control system processor(s) 490, flow control hardware 492, and/or the climate conditioning output elements 498 in the climate control system 200 (e.g., and that are included in the communication environment 400, etc.).

The user interface device(s) 488 may receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. For instance, a user input provided via one or more of the user interface device(s) 488 may, in conjunction with the climate control system processor(s) 490, control a behavior of the climate control system 200. User interfaces may include, but are in no way limited to, at least one graphical user interface of a display device (e.g., touchscreen, etc.), button, switch, lever, smartphone, portable computing touchscreen, communications equipment, etc.

Information measured by the climate control system sensors 433 and/or input received via the user interface device(s) 488 may be communicated (e.g., via a bus 460) to the climate control system processor(s) 490. The climate control system processor(s) 490 may determine based on the information received (e.g., from the thermal control system sensors 433 and/or the user interface device(s) 488, etc.) to control one or more of the flow control hardware 492 and/or the climate conditioning output elements 498 in the climate control system 200.

The flow control hardware 492 may comprise one or more components that stop, start, change, or otherwise control the flow of fluid (e.g., condensed water, condensate, filtered condensate, etc.) in the climate control system 200. The flow control hardware 492 may comprise one or more valves 494, pumps 496, and/or the like. The valves 494 may include, but are in no way limited to, solenoid valves, pneumatically-actuated valves, expansion valves, thermostatic expansion valves, ball valves, check valves, automatic control valves (e.g., relief valves, flow control valves, back-pressure sustaining valves, pressure control valves, etc.), four-way valves, three-way valves, proportional valves, etc., and/or combinations thereof the fluid control valve 304 is an example of one of the valves 494 in the flow control hardware 492. In some embodiments, one or more of these valves 494 may be controlled (e.g., opened, closed, flow restricted, etc.) via an electrical signal sent, or output, from the climate control system processor(s) 490. In some embodiments, the valves 494 may be turned on, off, or otherwise adjusted by the climate control system processor(s) 490 based on information received from the climate control system sensors 433, the user interface device(s) 488, and/or a combination thereof.

The pumps 496 may comprise one or more components that mechanical move a fluid (e.g., condensate, filtered condensate, condensed water, etc.) through one or more pipes, tubes, or other fluid lines 244, 258 in the climate control system 200. The pumps 496 may include the pump 248 described in conjunction with FIG. 2B. These pumps 496 may include, but are in no way limited to, centrifugal pumps, gear pumps, peristaltic pumps, positive displacement pumps, reciprocating pumps, rotary pumps, screw pumps, velocity pumps, etc., and/or combinations thereof. The pumps 496 may be controlled via on an electrical signal sent, or output, from the climate control system processor(s) 490. For instance, the electrical signal may selectively start the pumps 496, stop the pumps 496, alter a speed of the pumps 496, and/or otherwise control an operation or output of the pumps 496. In some embodiments, the pumps 496 may be turned on, off, or otherwise adjusted by the climate control system processor(s) 490 based on information received from the climate control system sensors 433, the user interface device(s) 488, and/or a combination thereof.

In some embodiments, the climate control system 200 may comprise one or more climate conditioning output elements 498. The climate conditioning output elements 498 may include, but are in no way limited to, heaters, condensers, compressors, chillers, air conditioners, accumulators, blowers, fans, evaporators, fragrance injection devices 308, misting devices 312, etc., misting systems 216A-C, combinations thereof, and/or the like. The climate conditioning output elements 498 may be controlled via an electrical signal sent, or output, from the climate control system processor(s) 490. In one embodiment, the climate conditioning output elements 498 may be turned on, off, or otherwise adjusted based on information received from the climate control system sensors 433, the user interface device(s) 488, and/or a combination thereof.

Figure 5:
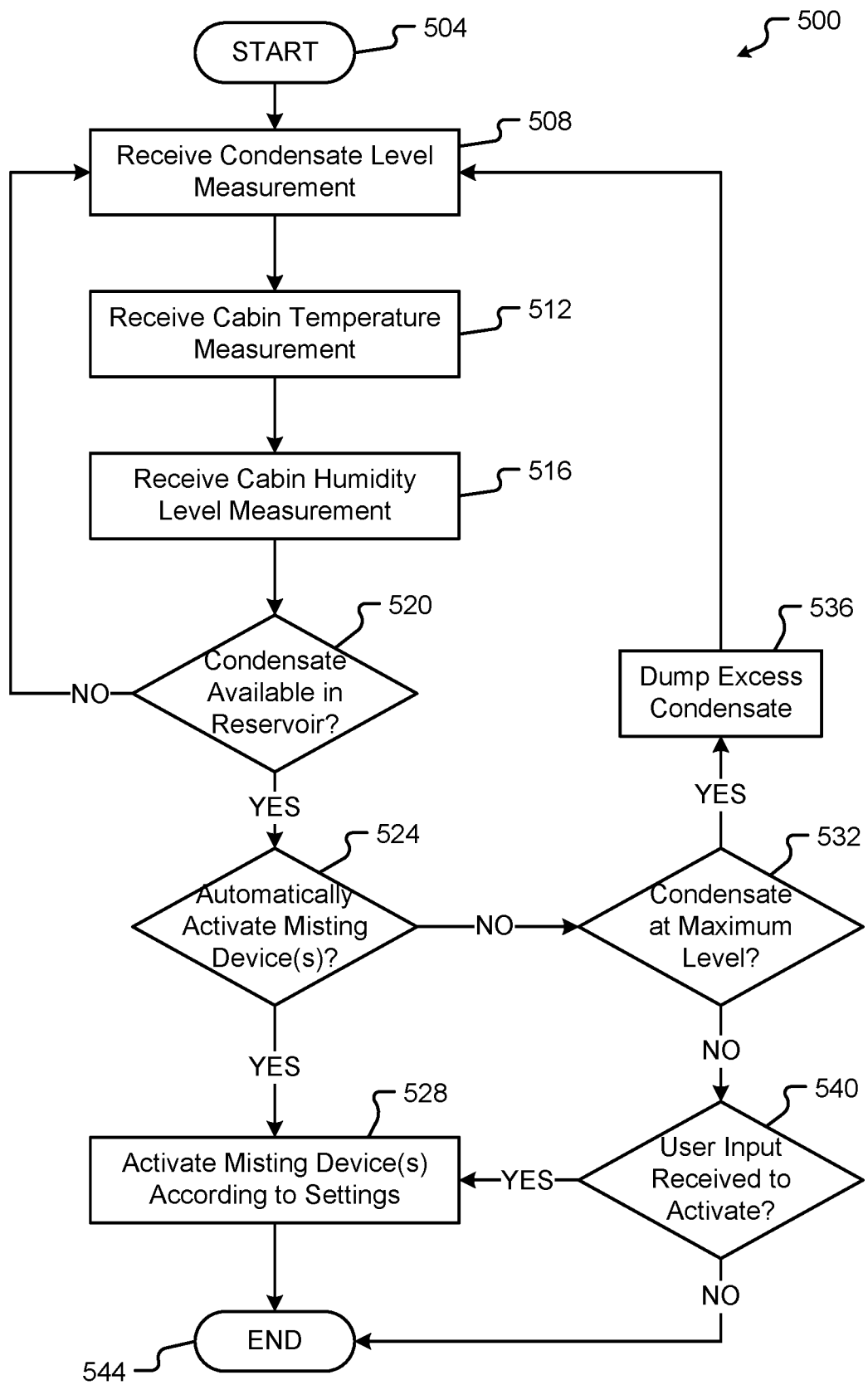
FIG. 5 is a flow diagram of a method for controlling the climate of the vehicle in accordance with embodiments of the present disclosure.

FIG. 5 is a flow diagram of a method 500 for controlling the climate of the vehicle 100 in accordance with embodiments of the present disclosure. While a general order for the steps of the method 500 is shown in FIG. 5, the method 500 can include more or fewer steps or can arrange the order of the steps differently than those shown in FIG. 5. Generally, the method 500 starts with a start operation 504 and ends with an end operation 544. The method 500 can be executed as a set of computer-executable instructions executed by a computer system (e.g., the sensor processors 440, the vehicle control system 448, the climate control system processor(s) 490, etc.) and encoded or stored on a computer readable medium (e.g., memory 464, etc.). Hereinafter, the method 500 shall be explained with reference to the systems, components, assemblies, devices, environments, etc. described in conjunction with FIGS. 1-4B.

The method 500 may begin at step 504 and proceed by receiving condensate level measurement data (step 508). The condensate level measurement data may be provided by the condensate level sensor 242 that is in communication with the condensate reservoir 240. In some embodiments, this measurement data may include a volumetric amount measurement (e.g., number of liters (L) or milliliters (mL) contained in the condensate reservoir 240, etc.) a threshold value limit (e.g., a predetermined amount of liquid, or condensed water, in the condensate reservoir 240, etc.), and/or combinations thereof. It is an aspect of the present disclosure that the condensate level measurement may be received by the climate control system processor(s) 490 and/or the sensor processors 440 in making control decisions for the climate control system 200.

Next, the method 500 may receive cabin temperature measurement data (step 512). The cabin temperature measurement data may be provided by the cabin temperature sensor 252 that is disposed inside the cabin 150 of the vehicle 100. In some embodiments, this measurement data may include a temperature measured in Fahrenheit (° F.), Celsius (° C.), etc., defining an ambient temperature associated with at least one climate zone 204A-C of the vehicle 100. The temperature measurement data may be received by the climate control system processor(s) 490 and/or the sensor processors 440 in making control decisions for the climate control system 200.

The method 500 may continue by receiving cabin humidity level measurement data (step 516). The cabin humidity level measurement data may be provided by the cabin temperature sensor 252, which may include one or more humidity sensors 480, and is disposed inside the cabin 150 of the vehicle 100. The measurement may define an amount of humidity (e.g., between 0% and 100%, etc.) inside the cabin 150 of the vehicle 100. The measurement may define a full-range relative humidity measurement inside the cabin 150 of the vehicle 100. In some embodiments, the humidity measurement may correspond to an amount of water per cubic meter at a specific temperature (e.g., $g/m^3$ at ° C., etc.). The humidity level measurement data may be received by the climate control system processor(s) 490 and/or the sensor processors 440 in making control decisions for the climate control system 200.

In some embodiments, the method 500 may continue by determining whether a predetermined amount of condensate is available in the condensate reservoir 240 for providing misting functionality (step 520). For instance, based on the condensate level measurement, the climate control system processor(s) 490 may determine whether there is enough condensate in the condensate reservoir 240 to provide a misting operation via the misting device(s) 312 in the climate control system 200. If a predetermined amount of condensate (e.g., in liters, etc.) is not available in the condensate reservoir 240, the method 500 may return to step 508. However, if the predetermined amount of condensate is available in the condensate reservoir 240, the method 500 may continue at step 524.

At step 524, the method 500 may proceed by determining whether based on the received cabin temperature measurement data, the cabin humidity level measurement data, and/or occupant preferences at least one misting device 312 of the climate control system 200 should be activated. In the event that at least one of the temperature inside the cabin is measured at, or above, a predetermined threshold value, and the humidity inside the cabin is below a predetermined threshold value, the climate control system processor(s) 490 may automatically determine to activate the misting device(s) 312 in the climate control system 200 (step 528). In some embodiments, the occupant preferences (e.g., stored in the control data 464 memory) may define the predetermined temperature and/or humidity threshold values. For instance, a first occupant may prefer a humidity level of 70% and an internal temperature of 72° F. while another occupant may prefer a humidity level of 60% and an internal temperature of 76° F.

If the method 500 determines not to automatically activate the misting device(s) 312 in the climate control system 200, the method 500 may continue by determining whether the condensate level is at a maximum value (step 532). The maximum value for the condensate may indicate that there is little, or no, room in the condensate reservoir 240 to continue to collect and hold condensate from the heat exchanger in the HVAC system 208, 212. In this case, the method 500 may proceed by draining, or dumping, excess condensate from the condensate reservoir 240 (step 536). In some embodiments, this draining may include remotely opening a drain valve associated with the condensate reservoir 240 and/or the reservoir output line 244 (e.g., via the climate control system processor(s) 490, etc.) to lower the amount of condensate in the condensate reservoir 240 (e.g., to a threshold minimum value or other predetermined amount).

In the event that the condensate is not determined to be at the maximum level, the method 500 may proceed by determining whether a user input is received to activate the misting device(s) 312 in the climate control system 200 (step 540). The user input may be provided by an occupant via one or more of the user interface device(s) 488. For instance, an occupant may determine that the air inside the cabin 150 of the vehicle 100 is too dry and, in response, provide an activation input (e.g., touch input, etc.) via the user interface device(s) 488 to activate the misting device(s) 312 in the cabin 150 of the vehicle. This user input may override the determination made in step 524.

Activating the misting device(s) 312 according to the settings, shown in step 528, may include directing filtered condensed water (e.g., via filtered condensate line 258) to the fluid control valve 304. The climate control system processor(s) 490 may control the fluid control valve 304 to open a flow path for the filtered condensed water to reach the misting device(s) 312. This condensed water may be introduced at a particular flow or volume to a vibratory element in the misting device(s) 312, as described above. The vibratory element may then be actuated (e.g., via the climate control system processor(s) 490) and convert (e.g., through vibration) the condensed water into a condensate mist output 316. The mist output 316 may then be expelled into the cabin 150 of the vehicle 100. The misting device(s) 312 are arranged, positioned, and disposed adjacent to the outlet 324, 334 that is in, or at, the cabin 150 of the vehicle 100. In some embodiments, the conditioned air 320 may mix with the condensate mist output 316, producing a mixed thermal output 328 (e.g., comprising the mist 316 and the conditioned air 320) that is expelled into the cabin 150, or climate-controlled space, of the vehicle 100.

In one embodiment, the settings for activating the misting device(s) 312 may include adding an aromatic (e.g., in the form of a fragrant fluid) to the filtered condensed water prior to converting the water into mist. In this case, the climate control system processor(s) 490 may control the fragrance injection device 308 to inject, or pump, the fragrant fluid, via the fluid control valve 304, into the fluid entering the input of the misting device(s) 312. The fragrant fluid, pumped along with the flow of condensed water, enters the misting device(s) 312 and is converted by the vibratory element into a scented mist that is expelled into the cabin 150 of the vehicle 100. In any event, the method 500 may end at step 544.

While the flowchart has been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, one or more aspects of the present disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing one or more aspects of the present disclosure illustrated herein can be used to implement the one or more aspects of this disclosure.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a climate control system, comprising: a heating, ventilation, and air conditioning (HVAC) system, comprising: an evaporator; a condensate reservoir that holds condensed water collected from the evaporator; and an HVAC outlet that outputs conditioned air of the HVAC system; an air duct comprising an air outlet disposed therein at a climate-controlled space, the air duct running from the HVAC outlet to the climate-controlled space, wherein the air duct conveys the conditioned air to the climate-controlled space via the air outlet disposed at the climate-controlled space; an ultrasonic vibratory device comprising a vibratory element arranged adjacent to the air outlet; and a condensate line running from the HVAC system to the ultrasonic vibratory device, wherein the condensate line conveys the condensed water received from the HVAC system to the vibratory element of the ultrasonic vibratory device and, when actuated, the vibratory element converts the condensed water into a mist that is expelled adjacent to the air outlet and into the climate-controlled space.

Aspects of the above climate control system include at least one of: wherein the condensate line is a separate line from the air duct and at least a portion of the condensate line is disposed in the air duct adjacent to the air outlet; a pump interconnected to the condensate line between the condensate reservoir and the ultrasonic vibratory device, wherein the pump pressurizes the condensed water conveyed via the condensate line; a filter interconnected to the condensate line between the pump and the ultrasonic vibratory device; wherein the filter comprises a bacteria and a particulate filtration medium, and wherein the condensed water is conveyed through the filter prior to reaching the ultrasonic vibratory device; a fluid control valve disposed along a length of the condensate line adjacent to the ultrasonic vibratory device, the fluid control valve interconnected to an input of the ultrasonic vibratory device, wherein the fluid control valve selectively controls a flow of the condensed water into the input of the ultrasonic vibratory device; a fragrance injection device interconnected to the fluid control valve, and wherein the fluid control valve selectively controls a flow of a fragrant fluid received from the fragrance injection device into the input of the ultrasonic vibratory device; wherein the mist comprising condensed water and the fragrant fluid mixes with the conditioned air as the mist is expelled adjacent to the air outlet into the climate-controlled space; wherein the vibratory element is disposed inside a portion of the air duct and mist is expelled through the air outlet into the climate-controlled space; and wherein the vibratory element is disposed outside a portion of the air duct and the mist is expelled through a misting outlet into the climate-controlled space.

Embodiments of the present disclosure also include a climate control method, comprising: receiving, via a level sensor, a condensate level of a heating, ventilation, and air conditioning (HVAC) condensate reservoir; receiving, via a temperature sensor disposed in a climate-controlled space, a temperature inside an area of the climate-controlled space; determining, via a processor, that condensate is available for generating mist inside the climate-controlled space; and activating, via the processor and in response to determining that the condensate is available and based on the temperature, an ultrasonic vibratory device comprising a vibratory element arranged adjacent to an air conditioning outlet at the climate-controlled space, wherein the vibratory element converts condensed water received from the HVAC condensate reservoir via a condensate line into a mist that is expelled adjacent to the air conditioning outlet and into the climate-controlled space.

Aspects of the above method include any of the aspects of the climate control system described above, as well as: wherein prior to activating the ultrasonic vibratory device, the method further comprises: receiving, via a humidity sensor disposed in the climate-controlled space, a humidity level measurement inside the area of the climate-controlled space, and wherein activating the ultrasonic vibratory device is based on the humidity level measurement; pressurizing, via a pump interconnected to the condensate line between the HVAC condensate reservoir and the ultrasonic vibratory device, the condensed water along the condensate line in a direction toward the ultrasonic vibratory device; forcing, via the pump, the condensed water through a filter interconnected to the condensate line between the pump and the ultrasonic vibratory device, the filter comprising a bacteria and a particulate filtration medium; controlling, via the processor and a fluid control valve interconnected to the condensate line and the ultrasonic vibratory device, a flow of the condensed water conveyed to the vibratory element; and controlling, via the processor and the fluid control valve interconnected to a fragrance injection device, a flow of a fragrant fluid received from the fragrance injection device conveyed to the vibratory element.

Embodiments of the present disclosure further include a vehicle, comprising: a climate-controlled cabin space; a climate control system, comprising: a heating, ventilation, and air conditioning (HVAC) system, comprising: an evaporator; a condensate reservoir that holds condensed water collected from the evaporator; and an HVAC outlet that outputs conditioned air of the HVAC system; an air duct comprising an air outlet disposed therein at the climate-controlled cabin space, the air duct running from the HVAC outlet to the climate-controlled cabin space, wherein the air duct conveys the conditioned air to the climate-controlled cabin space via the air outlet disposed at the climate-controlled cabin space; an ultrasonic vibratory device comprising a vibratory element arranged adjacent to the air outlet; and a condensate line running from the HVAC system to the ultrasonic vibratory device, wherein the condensate line conveys the condensed water received from the HVAC system to the vibratory element of the ultrasonic vibratory device and, when actuated, the vibratory element converts the condensed water into a mist that is expelled adjacent to the air outlet and into the climate-controlled cabin space.

Aspects of the above vehicle include any of the aspects of the climate control system and of the method listed above, as well as: wherein the condensate line is a separate line from the air duct and at least a portion of the condensate line is disposed in the air duct adjacent to the air outlet; wherein the climate control system further comprises: a pump interconnected to the condensate line between the condensate reservoir and the ultrasonic vibratory device, wherein the pump pressurizes the condensed water conveyed via the condensate line; a filter interconnected to the condensate line between the pump and the ultrasonic vibratory device, wherein the filter comprises a bacteria and a particulate filtration medium, and wherein the condensed water is conveyed through the filter prior to reaching the ultrasonic vibratory device; and a fluid control valve disposed along a length of the condensate line adjacent to the ultrasonic vibratory device, the fluid control valve interconnected to an input of the ultrasonic vibratory device, wherein the fluid control valve selectively controls a flow of the condensed water into the input of the ultrasonic vibratory device; wherein the climate control system further comprises: a fragrance injection device interconnected to the fluid control valve, and wherein the fluid control valve selectively controls a flow of a fragrant fluid received from the fragrance injection device into the input of the ultrasonic vibratory device; and wherein the mist comprising condensed water and the fragrant fluid mixes with the conditioned air as the mist is expelled adjacent to the air outlet into the climate-controlled cabin space.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with onboard rechargeable energy storage, including electric vehicles and hybrid electric vehicles.

Examples of processors as referenced herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJ-S™ processors. A processor as disclosed herein may perform computational functions using any known or future-developed standard, instruction set, libraries, and/or architecture.

What is claimed is:

1. A climate control system, comprising:
   a heating, ventilation, and air conditioning (HVAC) system, comprising:
      an evaporator;
      a condensate reservoir that holds condensed water collected from the evaporator; and
      an HVAC outlet that outputs conditioned air of the HVAC system;
   an air duct comprising an air outlet disposed therein at a climate-controlled space, the air duct running from the HVAC outlet to the climate-controlled space, wherein the air duct conveys the conditioned air to the climate-controlled space via the air outlet disposed at the climate-controlled space;
   an ultrasonic vibratory device comprising a vibratory element arranged adjacent to the air outlet;
   a condensate line running from the HVAC system to the ultrasonic vibratory device, wherein the condensate line conveys the condensed water received from the HVAC system to the vibratory element of the ultrasonic vibratory device and, when actuated, the vibratory element converts the condensed water into a mist that is expelled adjacent to the air outlet and into the climate-controlled space;
   a fluid control valve disposed along a length of the condensate line adjacent to the ultrasonic vibratory device, the fluid control valve interconnected to an input of the ultrasonic vibratory device, wherein the fluid control valve selectively controls a flow of the condensed water into the input of the ultrasonic vibratory device; and
   a fragrance injection device interconnected to the fluid control valve, and wherein the fluid control valve selectively controls a flow of a fragrant fluid received from the fragrance injection device into the input of the ultrasonic vibratory device.

2. The climate control system of claim 1, wherein the condensate line is a separate line from the air duct and at least a portion of the condensate line is disposed in the air duct adjacent to the air outlet.

3. The climate control system of claim 1, further comprising:
   a pump interconnected to the condensate line between the condensate reservoir and the ultrasonic vibratory device, wherein the pump pressurizes the condensed water conveyed via the condensate line.

4. The climate control system of claim 3, further comprising:
   a filter interconnected to the condensate line between the pump and the ultrasonic vibratory device.

5. The climate control system of claim 4, wherein the filter comprises a bacteria and a particulate filtration medium, and wherein the condensed water is conveyed through the filter prior to reaching the ultrasonic vibratory device.

6. The climate control system of claim 1, wherein the mist comprising condensed water and the fragrant fluid received from the fragrance injection device mixes with the conditioned air as the mist is expelled adjacent to the air outlet into the climate-controlled space.

7. The climate control system of claim 6, wherein the vibratory element is disposed inside a portion of the air duct and the mist is expelled through the air outlet into the climate-controlled space.

8. The climate control system of claim 6, wherein the vibratory element is disposed outside a portion of the air duct and the mist is expelled through a misting outlet into the climate-controlled space.

9. A climate control method, comprising:

receiving, via a level sensor, a condensate level of a heating, ventilation, and air conditioning (HVAC) condensate reservoir;

receiving, via a temperature sensor disposed in a climate-controlled space, a temperature inside an area of the climate-controlled space;

determining, via a processor, that condensate is available for generating mist inside the climate-controlled space; and activating, via the processor and in response to determining that the condensate is available and based on the temperature, an ultrasonic vibratory device comprising a vibratory element arranged adjacent to an air conditioning outlet at the climate-controlled space, wherein the vibratory element converts condensed water received from the HVAC condensate reservoir via a condensate line into a mist that is expelled adjacent to the air conditioning outlet and into the climate-controlled space.

10. The method of claim 9, wherein prior to activating the ultrasonic vibratory device, the method further comprises:
receiving, via a humidity sensor disposed in the climate-controlled space, a humidity level measurement inside the area of the climate-controlled space, and wherein activating the ultrasonic vibratory device is based on the humidity level measurement.

11. The method of claim 9, further comprising:
pressurizing, via a pump interconnected to the condensate line between the HVAC condensate reservoir and the ultrasonic vibratory device, the condensed water along the condensate line in a direction toward the ultrasonic vibratory device.

12. The method of claim 11, further comprising:
forcing, via the pump, the condensed water through a filter interconnected to the condensate line between the pump and the ultrasonic vibratory device, the filter comprising a bacteria and a particulate filtration medium.

13. The method of claim 12, further comprising:
controlling, via the processor and a fluid control valve interconnected to the condensate line and the ultrasonic vibratory device, a flow of the condensed water conveyed to the vibratory element; and
controlling, via the processor and the fluid control valve interconnected to a fragrance injection device, a flow of a fragrant fluid received from the fragrance injection device conveyed to the vibratory element.

14. A vehicle, comprising:
a climate-controlled cabin space;
a climate control system, comprising:
a heating, ventilation, and air conditioning (HVAC) system, comprising:
an evaporator;
a condensate reservoir that holds condensed water collected from the evaporator; and
an HVAC outlet that outputs conditioned air of the HVAC system;
an air duct comprising an air outlet disposed therein at the climate-controlled cabin space, the air duct running from the HVAC outlet to the climate-controlled cabin space, wherein the air duct conveys the conditioned air to the climate-controlled cabin space via the air outlet disposed at the climate-controlled cabin space;
an ultrasonic vibratory device comprising a vibratory element arranged adjacent to the air outlet;
a condensate line running from the HVAC system to the ultrasonic vibratory device, wherein the condensate line conveys the condensed water received from the HVAC system to the vibratory element of the ultrasonic vibratory device and, when actuated, the vibratory element converts the condensed water into a mist that is expelled adjacent to the air outlet and into the climate-controlled cabin space;
a fluid control valve disposed along a length of the condensate line adjacent to the ultrasonic vibratory device, the fluid control valve interconnected to an input of the ultrasonic vibratory device; and
a fragrance injection device interconnected to the fluid control valve, and wherein the fluid control valve selectively controls a flow of a fragrant fluid received from the fragrance injection device into the input of the ultrasonic vibratory device.

15. The vehicle of claim 14, wherein the condensate line is a separate line from the air duct and at least a portion of the condensate line is disposed in the air duct adjacent to the air outlet.

16. The vehicle of claim 14, wherein the mist comprising condensed water and the fragrant fluid received from the fragrance injection device mixes with the conditioned air as the mist is expelled adjacent to the air outlet into the climate-controlled cabin space.

17. The vehicle of claim 14, wherein the climate control system further comprises:
a pump interconnected to the condensate line between the condensate reservoir and the ultrasonic vibratory device, wherein the pump pressurizes the condensed water conveyed via the condensate line.

18. The vehicle of claim 17, wherein the climate control system further comprises:
a filter interconnected to the condensate line between the pump and the ultrasonic vibratory device, wherein the filter comprises a bacteria and a particulate filtration medium.

19. The vehicle of claim 18, wherein the condensed water is conveyed through the filter prior to reaching the ultrasonic vibratory device.

20. The vehicle of claim 14, wherein the fluid control valve selectively controls a flow of the condensed water into the input of the ultrasonic vibratory device.

* * * * *